United States Patent Office 2,758,806
Patented Aug. 14, 1956

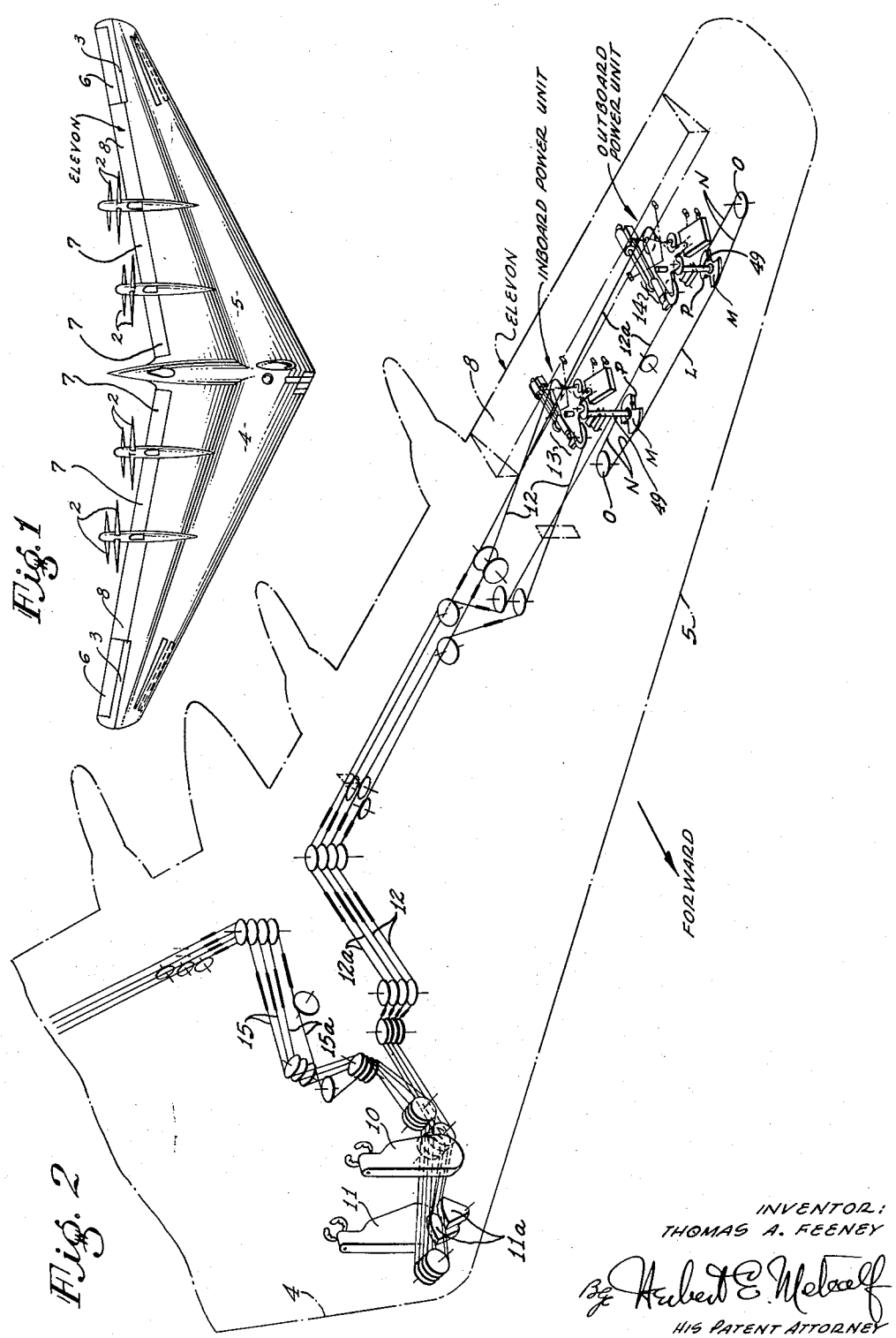

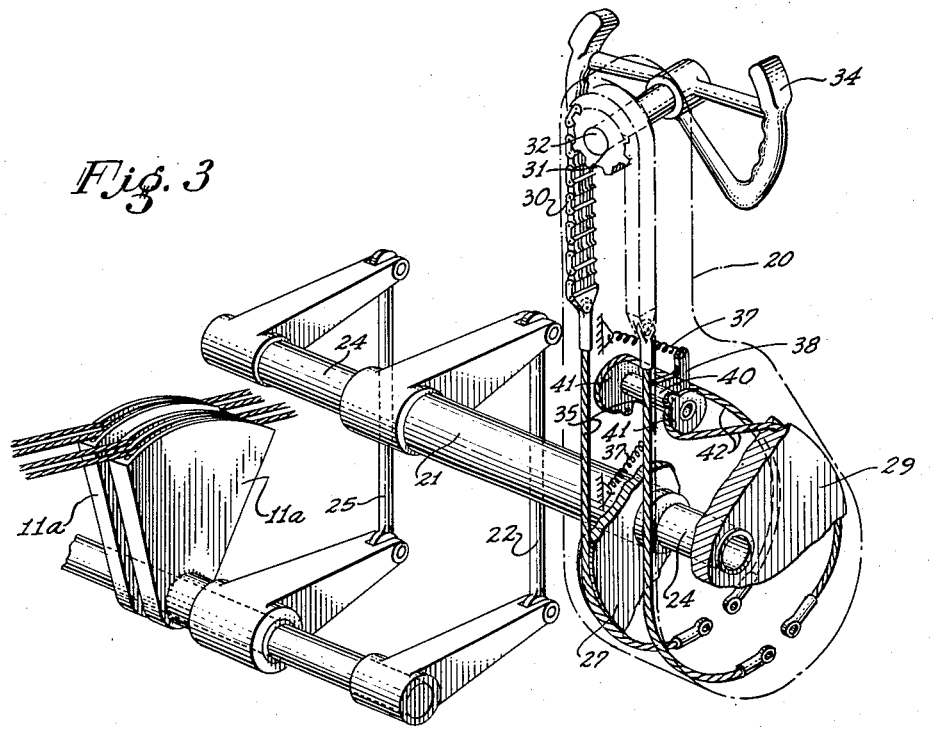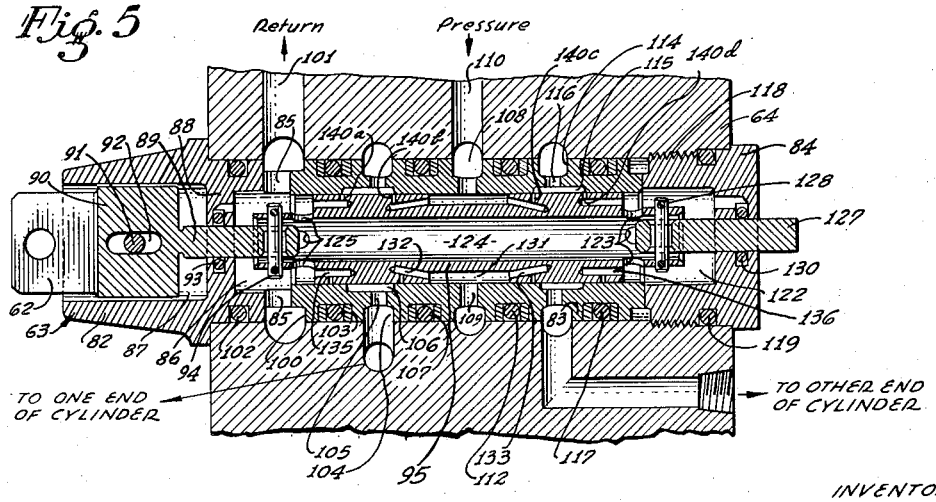

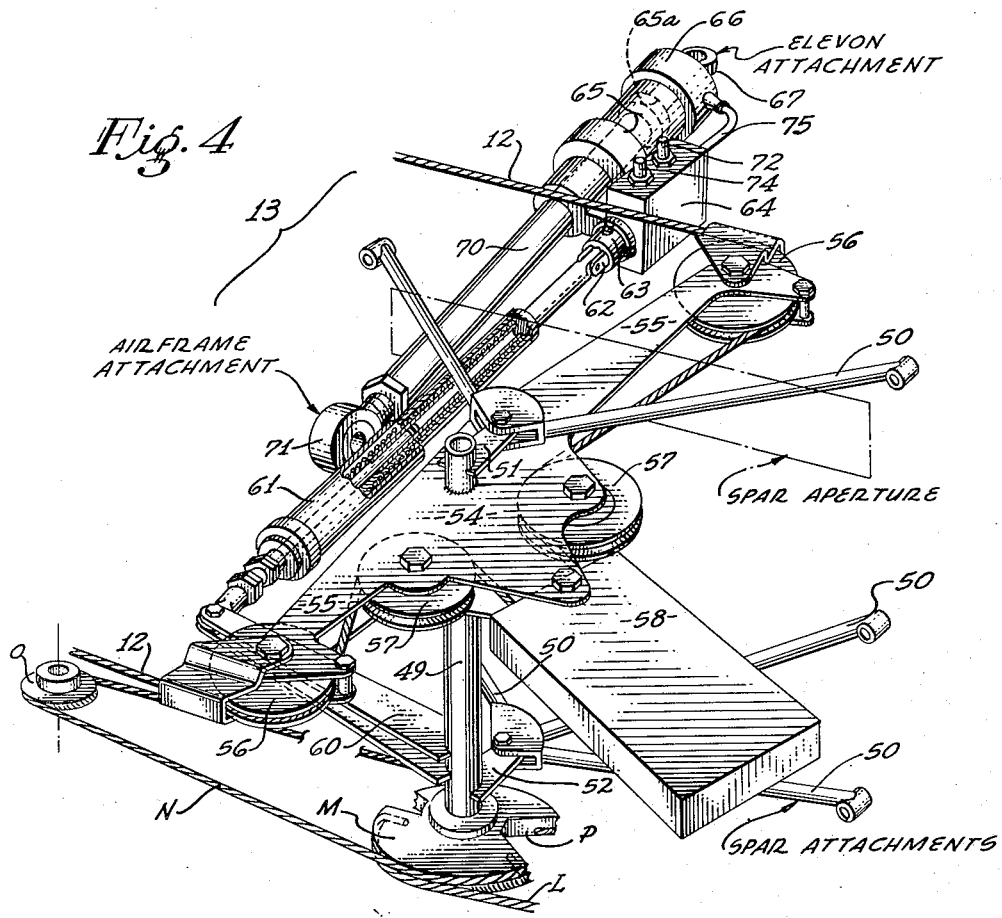
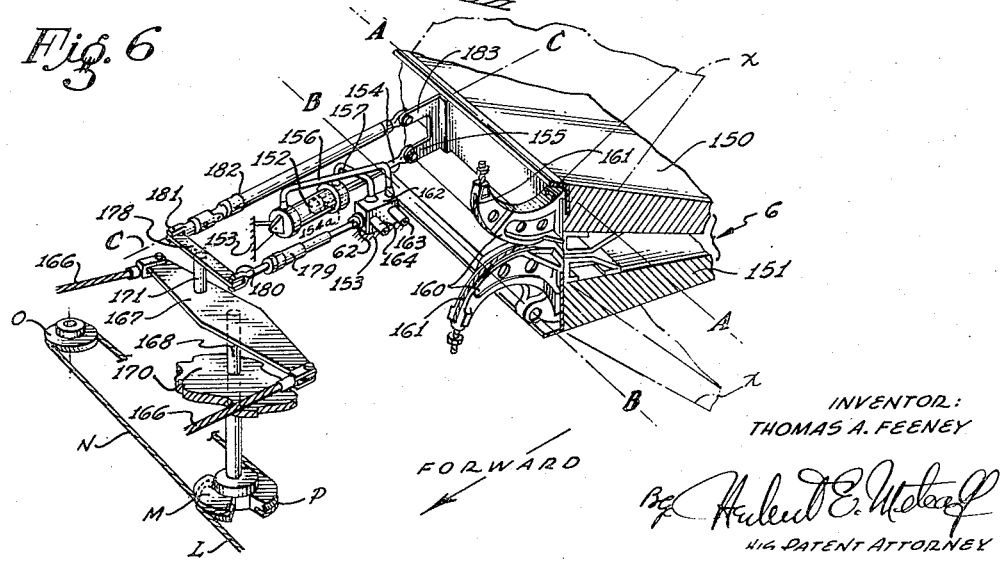

2,758,806

AIRPLANE SAFETY CONTROL SYSTEM

Thomas A. Feeney, Los Angeles, Calif., assignor to Northrop Aircraft, Inc., Hawthorne, Calif., a corporation of California Application July 3, 1952, Serial No. 297,049

17 Claims. (Cl. 244—85)

The present invention relates to full powered airplane controls and, more particularly, to a means and method of controlling large airplane control surfaces under power only, by a minimum exertion of force by the pilot of the airplane and with a maximum of safety. This application is a continuation-in-part of my prior application Serial Number 23,567, filed April 27, 1948, and now abandoned.

In U. S. application, Serial Number 681,890, filed July 8, 1946, since matured into Patent Number 2,582,348, dated January 15, 1952, J. K. Northrop and I described and claimed certain control surfaces suitable for all-wing airplanes, notably, those used on the U. S. Army bombers designated as the XB-35 and YB-49.

The full powered surface controls of the XB-35 bomber are hydraulically operated under the application of minimum stick force by the pilot, without control surface feed-back or feel being transmitted to the pilot, and the present invention has for an object the provision of a means and method of obtaining full power operation of large airplane control surfaces, such as those used in the XB-35 and YB-49 for example, or in other large airplanes of the more conventional type.

It is an object of the present invention to provide a safe means and method of operating airplane control surfaces under full power without normally transmitting force back to the pilot and with a simple mechanical unit that has minimum hunting characteristics.

With full power operation of the control surfaces, the applied pilot force need only be nominal, and it is another object of the present invention to provide a full power operated airplane surface control where the force applied by the pilot for operation thereof is of negligible importance, irrespective of the actual force required to move the control surface.

In the preferred embodiment of my invention, hydraulic motors are utilized with the pilot's control element being connected directly to the valve controlling the flow of hydraulic fluid to the motor, as by cables for example. As it is possible for such valves to jam or bind in use due to the entrance of foreign matter into the valve, care must be taken that such a valve jaw does not prevent the operation of the control surface by the pilot. In addition, in military airplanes cable connections are subject to damage in action.

Accordingly, it is another object of the present invention to provide a hydraulic full power attitude surface control system for airplanes that provides maximum safety under adverse operating conditions.

By the use of the present invention, a full power attitude control system is provided achieving maximum safety of operation without the necessity of resorting to a separate emergency system. In brief, the present invention includes the use of two motors, each for example of the cylinder and piston type, connected to move, when energized, the same attitude control surface of an airplane. A fluid control valve is used on or near each motor to control hydraulic fluid from a constant pressure source to energize the motor. Each valve is connected by separate cables to the pilot's control element, wheel column or stick, and a separate cross connection control between the two halves is made adjacent the two motors. Thus if either cable connection from the pilot's control element is broken, the undamaged cable connection will operate both valves, one directly and the other through the cross connection. In order to prevent the jamming of one valve from immobilizing the other valve, a spring loaded connection is made between each valve and each cable connection to the pilot's control element; these spring loaded connections also being between each valve and the cross connection between the valves. The spring loading is made sufficiently powerful so that in ordinary operation of the airplane, the connections from the pilot's control element to the valves act as solid connections. If, however, one valve should jam, the pilot can override the spring loading on the jammed valve to control the surface by the other valve. In addition, the system will operate with one jammed valve and with either cable connection to the pilot's control element shot away.

The spring loaded connection at each valve can serve another important function: By proportioning the constant pressure of the source of hydraulic power with the piston size in the hydraulic motor, the maximum force that can be applied to the surface by the system can be predetermined so that under air-loads that might well cause the hinge moments on the surface to exceed safe figures, the surface can reverse the motor thereby preventing damage to the surface. That is, dangerously high air-loads on the surface are able to force the actuating cylinder and piston assembly back in "reverse" from the position being called for by the pilot-operated control valve, thus actually stalling and then pushing hydraulic fluid back through the pressurized cylinder port. As it is preferred to have internal valve travel less than the distance the pilot can move the control element, it would be possible for the valve to bottom in its casing thereby transmitting full surface-load to the pilot. As it is preferred that the cable connections between the valves and pilot be of minimum weight, such bottoming will override the spring loading and limit the force feed-back to the pilot to the preload of the spring connections.

Other objects and advantages of the present invention will be apparent from a description of the appended drawings in which:

Figure 1 is a diagrammatic plan view of one form of airplane to which the present invention may be applied.

Figure 2 is a diagram of the cable and motor assembly used to move the elevons of the airplane shown in Figure 1.

Figure 3 is a perspective view of a pilot's control column connected for elevon control.

Figure 4 is a perspective view of one preferred form of hydraulic motor power unit used for full power control of the elevons on the airplane of Figure 1.

Figure 5 is a longitudinal sectional view showing a servo-valve construction suitable for use in the power unit of Figure 4.

Figure 6 is a perspective diagram of a motor unit suitable for rudder operation.

Referring first to Figure 1, the all-wing airplane shown diagrammatically is the XB-35, having four reciprocative motors within the airplane driving pusher propellers 2, and having a wing spread of 172 ft. with a length of 53 ft. The control surfaces for this airplane comprise outer trim flaps 3 on each wing panel 4 and 5 having separable drag rudders 6 mounted thereon, inner landing flaps 7, and intermediate elevons 8. All of these control surfaces are full power operated by the pilot with no pilot force whatever being applied to the control surfaces, and the present invention will be described as applied to the power means used for full power operation of the elevons and drag rudders.

The elevon control system is shown diagrammatically in Figure 2. Here the pilot's control column 10 and copilot's control column 11 are interconnected and connected to operate quadrants 11a. From quadrants 11a, two separate sets of control cables 12 and 12a are respectively connected to operate left inboard and outboard hydraulic power units 13 and 14. Similarly, quadrants 11a are connected by separate cables 15 and 15a to right inboard and outboard power units in the right wing 4 which is only partially shown. A cross cable connection L is made between each of the left power units as shown, and similarly between each of the right power units. Thus each of the four power units is connected to be separately operated directly from the control quadrants at the control columns with a cross cable connection between the power units connected to the same surface. The power units are connected to be operated in parallel on each elevon, and are operated together in the same direction for elevation control and in opposite directions for aileron type control, thus giving rise to the term elevon. The elevons can be moved in this manner for example, by the construction of the control column as shown in Figure 3, which will next be briefly described.

A control column casing as indicated by broken line 20 is mounted on a composite shaft comprising an outer tube 21 connected by linkage 22 to one cable quadrant 11a, and an inner shaft 24 connected by another linkage 25 to the other cable quadrant 11a. Inside casing 20 a tube drum 27 is mounted on tube 21 and a shaft drum 29 is mounted on shaft 24, these drums being of the same diameter and cut away in the figure for clarity. A chain 30 is driven by a sprocket 31 on one end of wheel shaft 32, the wheel shaft 32 extending out of casing 20 with a wheel 34 mounted thereon.

The ends of chain 30 are connected to chain cables 35, one passing about halfway around tube drum 27 and then being fixed thereto, the other passing similarly around shaft drum 29. Thus when wheel 34 is rotated, opposite motion of cable quadrants 11a is obtained, and when the casing 20 is rocked forward or aft, both quadrants will move together for elevator control. Opposed springs 37 are attached to levers 38 attached to centering shaft 40 which has end drums 41 thereon connected on opposite sides to centering cables 42 one of which passes around drum 27 and the other around drum 29 to be affixed thereto. Opposed springs 37 provide forces centralizing wheel 34 in a predetermined neutral position. The centralizing system for elevator movement of the column is not shown but may be similar to that described above, or may be of a type applying an aerodynamic feel from a bellows actuated primarily by an air flow separate from the controlled surface for example.

I refer next to Figure 4, which shows in perspective view an installation of a hydraulic motor as used to operate an elevon. A vertical axle 49 is placed within a wing panel, for example, and pivoted to wing spar attachments 50 at each end thereof respectively, by short bellcrank arms 51 and 52 respectively. Above, axle 49 carries a pulley plate 54 extended to cross arms 55 carrying end pulleys 56 over which run control cables 12 operated by the pilot from the control column 10 or 11. Cables 12 pass around tension box pulleys 57 to enter a cable tensioning box 58 attached to the pulley plate 54 as is well known in in the art. Rotation of axle 49 by the pilot moves long bell crank arm 60 which is attached to a spring loaded valve operating rod 61 passing through an aperture in the wing spar to link directly with a valve spool attachment 62.

Valve spool attachment 62 enters a valve assembly 63 inserted in a valve block 64 securely fastened to one end of a hydraulic motor cylinder 65, the other end 66 of cylinder 65 being attached to an elevon operating arm (not shown) by elevon attachment 67. A hydraulic piston rod 70 enters cylinder 65 opposite elevon attachment 67 and is attached to the airframe by wing attachment fitting 71. Piston rod 70 is, as is well known in the art, attached to a hydraulic piston 65a inside of cylinder 65.

Valve block 64 is provided with a hydraulic fluid pressure inlet 72 and a fluid return pipe 74. The piston rod end of the cylinder 65 is supplied with fluid through the valve block, and the closed end of the cylinder is supplied through the block and through outside pipe 75. Referring again to Figure 2, the cross connection between power units 13 and 14 is created by cross connection cable L connected to an axle quadrant M on the end of axle 49 of one power unit 13 and to a similar axle quadrant M on the axle 49 of the other power unit 14. In each power unit, an idler cable N is attached at one end thereof to an axle quadrant M and passes around an idler pulley O to return to an opposite axle quadrant P also mounted on axle 49. Thus when both cables 12 and 12a are intact, cross connection cable L merely idles. However, if either cable 12 or 12a is broken for any reason, both valve rods will still be driven, one directly through cable 12 or 12a; the other indirectly through cross connection cable L.

There are several preferred requirements for the operation of the valve assembly 63, namely: there should be a neutral leakage in the valve with a restricted flow increasing as the valve spool moves away from neutral, the valve should provide a preload on both sides of the piston to resist movement of the surface away from neutral due to air shock, and the valve should be sensitive, thereby permitting the pilot to make small corrective movements of the control surface. Several types of valves can satisfy these requirements and one of them will be described in detail herein, as shown in Figure 5. This particular valve is shown, described and claimed by Parker in a copending application, Serial No. 17,624, filed March 29, 1948, now Patent No. 2,631,571.

In Figure 5, valve assembly 63, one end of which projects from valve block 64 in Figure 4, comprises a spool casing adapted to be fastened into valve block 64 and an inner spool to be moved by valve operating rod not shown. The spool casing starts at the left of the figure, with a hollow spool slide end 82 followed by a barrel portion 83 of uniform outer diameter to terminate in a threaded end 84.

The inner terminus of slide end 82 is provided with opposed ports 85 entering a return chamber 86 which is separated from a slide chamber 87 in this end by a partition 88 bored out to pass a spool rod 89 attached outside of partition 88 to a slide 90 in turn attached to valve spool attachment 62. Slide 90 is held to a fixed travel by slide pin 91 attached to slide end 82. This pin passes through elongated hole 92 in the slide 90. A spool rod packing 93 is installed in partition 88. Spool rod 89 is attached by spool pin 94 to a spool 95 sliding inside of the spool casing. Spool pin 94 is in line with opposed ports 85 for easy assembly. Spool 95 will be described later.

On the outside of the spool casing, communicating with opposed ports 85, is a return fluid groove 100, which, when the valve assembly is in place in valve block 64, communicates with return bore 101. An outer slide end packing seal 102 isolates return fluid groove 100 from the outside of the valve block.

To the right of the return fluid groove 100 is an outer ring seal 103 separating outer fluid return groove 100 from one cylinder chamber groove 104 having circumferential cylinder ports 105 therein communicating with inner cylinder chamber groove 106 facing the spool 95. Another outer ring seal 107 follows, then an outer pressure fluid groove 108 communicating with the interior of the spool casing without an inner groove by pressure ports 109.

The outer pressure fluid groove 108 connects through valve block 64 with pressure inlet 72 through pressure bore 110.

Next is still another ring seal 112 followed by a second outer cylinder chamber groove 114 connecting with an inner second cylinder chamber groove 115 by circumferential return ports 116. A fifth ring seal 117 follows. Next comes the threaded end 84 with threads 118 sealed from the outside by threaded end ring seal 119.

Threaded end 84 is provided with a threaded end return fluid chamber 122 connecting with slide end return chamber 86 by threaded end ports 123, through a central spool bore 124 and slide end ports 125. These latter ports 125 connect with return groove 100, bore 101, and then return pipe 74 shown in Figure 4.

Both ends of spool 95 are exactly alike, the spool being attached at the threaded end to a spool idler rod 127 by idler pin 128. Idler rod 127 passes through the threaded end 84 and is sealed by idler rod seal 130 mounted in the threaded end. As the exposed areas at each end of spool 95 are the same, no piston effect is applied by the return fluid pressure.

Opposite pressure ports 109 leading to outer pressure fluid groove 108, the spool is cut away to form a circumferential fluid distributing groove 131 extending equal distances, when the spool is in neutral position, on each side of pressure ports 109. This distributing groove 131 is provided with sides normal to the surface of the bore in which the spool slides, and a plurality of circumferentially distributed pressure bores 132 and 133 extend longitudinally in the spool wall from respective sides of the pressure distributing groove 131 a sufficient distance to terminate beyond the near sides of inner first and second cylinder chamber grooves 106 and 115 in the spool casing.

Both ends of the spool 95 are also cut away opposite return fluid chambers 86 and 122 to form shoulders which also have circumferentially spaced return bores 135 and 136 extending longitudinally into the spool 95 past the opposite sides of the inner first and second cylinder chamber grooves 106 and 115 respectively.

The spool construction is completed by four sets 140a, 140b, 140c and 140d of flow holes bored normal to the peripheral surface of the spool and entering the various bore holes 132, 133, 135 and 136 respectively. These flow holes are bored with definite patterns with respect to the various inlets and outlets of casing and said spool. These flow holes are used to pass all the fluid flow through the valve, as slide pin 91 limits the travel of the spool to less than the travel required to open pressure groove 131 on the spool to either of the inner cylinder chamber grooves 106 or 115.

In Figure 5, the spool is shown in neutral position. The flow holes 140b and 140c nearest to the pressure inlet are arranged to be bisected by the more central shoulders of cylinder grooves 106 and 115. The flow holes 140a and 140d nearest the ends of the spool are also bisected by the outer shoulders of return flow grooves 106 and 115 respectively. Thus, in neutral position a small flow is constantly applying pressure to both ends of cylinder 65 of Figure 4 through the centrally bisected flow holes. The fluid then leaks to return through flow holes 140a and 140d.

In one preferred form of valve, a constant pressure of 2000 p. s. i. from a constant pressure source such as a controlled pressure pump driven by one of the engines of the airplane for example, is used in pressure inlet 72, and the bisected flow holes are proportioned to provide a pressure drop of 1000 p. s. i. across the cylinder supply ports. In consequence, there is at all times, in the neutral spool position, a preload of 1000 p. s. i. on both sides of the cylinder piston, thus preventing motion of the attached control surface under shock conditions.

A minute movement of the spool of only about .007" in the case of the use of a first flow hole of .013" diameter for example, will close the normally bisected flow holes on one side of the spool and open the other normally bisected holes. Then fluid flow to one side of the piston will be made at a highly restricted rate as determined by the pressure and hole diameter so that the piston moves very slowly. Further motion of the spool will uncover more holes in the patterns on one side of the spool and close those on the other side so that an increasing but still restricted flow will be obtained to move the piston faster.

In one specific example a neutral leakage hole .015" in diameter and additional flow holes of the same diameter are used in each pattern. A neutral leakage flow of .02 G. P. M. through the bisected first holes is obtained from the 2000 p. s. i. source. A maximum flow rate of from 3 to 5 G. P. M. can be obtained according to the number of flow holes used in each pattern as the spool is moved in either direction so that the holes in one pattern are completely open with the opposite holes completely closed. A spool travel of only about .125" from neutral is utilized, providing a full spool travel for the entire range of movement of the elevon of about .30". This travel is less than the stroke of valve operating rod 61.

In the preferred form of elevon motor shown in Figure 4, the valve operating rod 61 is spring loaded in both directions. This rod, under all normal circumstances, acts as a solid rod as far as the operation of the valve is concerned, but as the spool travel in this preferred construction is about .125" in either direction and the quadrant travel may be several inches, it might be possible for the pilot to operate his control column faster than the cylinder and piston could move the connected control surface. If this should happen, the spool would have full pilot force applied thereagainst, if rod 61 were solid. By spring loading this rod in both directions to permit change in length of about 50% of the quadrant travel, the spring load can be made so that when the rod lengthens or contracts, only a safe force is applied to the valve spool and block if the rate of pilot movement of the control is greater than the rate of response of the hydraulic motor. This spring loaded rod also permits full operation of one motor unit when the valve spool of the other motor unit is jammed, and prevents damage to the valve spools if the pilot's control element is operated without hydraulic pressure on the cylinder piston.

In operation, it will be noted that as the cylinder is attached to the elevon operating arm and the piston rod to the wing, and as the valve and valve block is attached to the cylinder, with the valve operating rod 61 coming from the wing, no mechanical feed-back link is needed. With the valve operating rod 61 in neutral position the elevon is held in neutral position by the preload mentioned above. When the valve operating rod 61 is moved away from neutral by the pilot the spool is moved and fluid is admitted to one or the other sides of the piston, with the opposite side of the piston open to the fluid return. The cylinder then moves in accordance with the pressure application, and the elevon is moved. As the elevon moves, however, the valve also moves as it is attached to the cylinder but the spool does not, as it is held in position by the pilot. When the neutral point of the spool within the valve is reached the elevon movement stops, having moved away from neutral in accordance with pilot control movement. Thus, the cylinder and, consequently, the elevon will follow all pilot initiated movement of the valve operating rod 61. The extremely short feed-back circuit created by the attachment of the valve to the cylinder with cylinder moving with the elevon effectively prevents hunting.

As the cylinder and valve casing are both attached to the elevon and move with it, the follow-up movement of the cylinder and valve casing is equal to the initiating movement of the valve spool by the pilot. As the aerodynamic response of elevon movement is substantially linearly related to movement of the elevon, it is clear that in this construction the aerodynamic response will be substantially linearly related to movement of the pilot's control.

In certain types of airplanes, such as the all-wing airplane shown in Figures 1 and 2, it is desirable to employ drag type rudders 6 to achieve directional control, because of the absence of a tail section for mounting a conventional rudder. Such drag rudders may take the form of hinged flaps simultaneously opened to project both above and below the trailing edge of the wing, preferably near the tips thereof. Using such a split-flap rudder, a linear relation between pilot's rudder pedal movement and rudder surface separation does not provide a linearly related amount of aerodynamic response. Instead, there must be a relatively large movement of the rudder surfaces near the closed position to obtain a small aerodynamic response, changing into a small surface movement near the full open position for a large response. Since it is desired to provide a linear relation between rudder pedal movement and aerodynamic response, a biased feed-back system is desirable for operation of the rudder surfaces.

Full power operation of the rudder is accomplished by the pilot, operating the hydraulic servo valves of two power units through a control cable from rudder pedals (not shown) as in the aileron control above described, to govern the opening and closing of the rudder flaps. As in the aileron system previously described herein, the valve of each motor of the pair controlling one set of rudder flaps is actuated separately and directly from the rudder cables with a cross connection between the valves of the motors of each pair. In order that each rudder pedal position will correspond to a definite surface position, a follow-up rod driven by the rudder is used to shut off the servo valve when the correct surface separation is reached. The relation between rudder pedal displacement and surface movement is made non-linear by the fact that one end of the follow-up describes a circular arc, while the other end traces a straight line, identical in part to the motion of a connecting rod between a piston and crankshaft.

In Figure 6, diagrammatically showing one motor unit only of the pair used to control one rudder, each rudder 6 consists of two panels or flaps 150 and 151, one mounted on top of the other along the trailing edge of trim flap 3 (Figures 1 and 2), with their forward edges hinged to the trim flap 3 along axes A and B respectively, so that when they are operated, one will rotate upwardly and the other will rotate downwardly, assuming the position indicated by the dotted lines X. The upper rudder flap 150 is rotated about its hinge line A by the action of a hydraulic rudder cylinder 152, the forward end of which is anchored to the aircraft structure 153. A piston rod 154 projects aft from the cylinder 152 and attaches to an operating arm 155 mounted on the upper rudder 150. The other end of the piston rod 154 is connected to the customary piston 154a enclosed in the rudder actuating cylinder 152. Hydraulic supply and return lines 156 and 157 are connected to the cylinder 152 on opposite sides of the enclosed piston 154a, so that fluid pressure may be made to extend or retract the piston rod 154 and thereby operate the upper rudder flap 150.

Two opposing quadrants 160 are installed in back-to-back relationship, one on the upper rudder flap 150 and one on the lower rudder flap 151. Crossed cables 161 are then connected, each with one end attached to the forward end of each quadrant 160, and the other end attached to the aft end of each quadrant, to cause the lower rudder 151 to operate from the upper rudder 150, but in the opposite direction. The hydraulic supply and return lines 156 and 157 connect to a rudder servo valve 162 which controls the actuating cylinder 152. Also connected to the servo valve 162 is a hydraulic pressure supply line 163 and a return line 164 from the airplane's constant pressure hydraulic system. As in the previous embodiment, a valve spool is provided which, by its position within the valve 162, determines which of the cylinder lines 156 or 157 is pressurized, or, which in the neutral position, applies a leakage pressure to both cylinder lines 156 and 157. Servo valve 162 is fixed to aircraft structure 153, while the valve spool is free to slide, within limits, in or out of the servo valve. The servo valve 162 may be similar to the example previously described except that it is attached to the aircraft structure instead of to the actuating cylinder. In addition, due to an increased airload it may be desirable to have fluid flow in the rudder valves approximately twice that used in the elevon valves.

Two rudder control cables 166 from one of the pilot's rudder pedals connect, one to each end of a cable lever 167 pivoted on a support shaft 168 midway between the ends. This support shaft 168 is mounted on a bracket 170 firmly attached to the aircraft structure 153. A link pin connection 171 is provided on the cable lever 167, between shaft 168 and one of the cable attachments. To the link pin connection 171, a valve feed-back link 178 is rotatably attached approximately at its midpoint above the cable lever 167. One end 180 of the valve link 178 is connected by a spool rod 179 to the valve spool; this connection to link 178 being at a point preferably coaxial with the cable lever support shaft 168 when the servo valve spool is in the neutral position. The other end 181 of the valve link 178 is pinned to one end of a spring loaded follow-up rod 182, which connects to a horn 183 that is firmly attached to the upper rudder 150, and projects forwardly and slightly downwardly from the hinge axis A.

In the closed position of the rudder flaps, the follow-up rod 182 is not on a straight line with the hinge axis A, but is nearly so; the extended center line C of the follow-up rod 182 passing slightly beneath the hinge axis A.

The desired cross connection between the power units on each rudder is made in this case by attaching axle quadrants M and P to shaft 168 and connecting the quadrant M to the quadrant M, by the cross connection cable L to the quadrant M of the other power unit assembly (not shown) exactly as set forth in the description of the cross connection between the two power units used for elevon control.

When drag rudders 6 are used, it is customary to connect the rudder on one wing tip to its own operating pedal only, in order that both rudders may be opened simultaneously to obtain the desired bilateral drag, and this connection is followed in the system herein described.

In operation, when one rudder pedal is pushed by the pilot, the cable lever 167 connected to that pedal rotates clockwise, as viewed from above, about its support shaft 168, displacing the link pin connection 171 to the right. This rotates the valve link 178 about the forward end of the follow-up rod 182, which is yet stationary, and moves the spool rod 179 toward the servo valve 162, admitting fluid pressure to the proper end of the actuating cylinder 152 to separate the rudders 150 and 151. As the upper rudder 150 rotates about its hinge axis A, the horn 183 moves downwardly and to the rear, also about the same hinge axis A. The follow-up rod 182 is thus pulled to the rear, and now the valve link 178 pivots about the link pin connection 171, which is stationary while the pedal is being held down. The valve link 178, driven by the follow-up rod 182, returns the valve spool to its neutral position, stopping the rudder surface movement. The servo valve 162 is now closed and the rudders are held in some open position until subsequent movement of the cable lever 167. In a manner similar to that described, any surface position can be obtained by the proper amount of pedal displacement.

As the rod 182 and horn 183 are nearly in alignment at the beginning of rudder flap movement, the feed-back travel of rod 182 and connected valve spool will be small during the initial movement of the rudder surfaces. Thus, the rudder surfaces will separate a substantial distance before shutting off flow in valve 162. However, after the rudder surfaces have opened a substantial distance the angle of horn 183 with rod 182 approaches 90° and the follow-up response approaches linearity. Thus, for a given movement of the rudder pedal, movement of the rudder surfaces is greater near the closed position than near the open position thereof.

This non-linearity is used to make the aerodynamic response of the surfaces substantially linear with movement of the rudder pedal. In the XB–35 airplane described above, the aerodynamic response to rudder flap separation is small until the flaps are separated about 4 inches at their trailing edges. This initial separation can be made to take place with a very small pedal movement by use of the linkage described above.

As each rudder pedal is moved by pilot applied force in one direction only, follow-up rod 182 need be spring loaded in one direction only. This spring loading will permit rod shortening under pilot force when a spool is jammed, will prevent pilot force being applied to valve 162 when no hydraulic pressure is present to move the rudder surfaces. In addition, the spring loaded rod will, particularly when used on rudders of the split-flap type described herein, permit the surfaces to be forced back toward the closed position by air loads applied thereon when, for example, it would be dangerous for the surfaces to be fully separated, such as at high speed. This safety feature is accomplished by regulating the maximum applied hydraulic force to a valve where safe airloads on the surfaces cannot be exceeded. Under these circumstances, at this airload the surfaces will not open further. If, however, the pilot should hold the valve wide open, and the airload should close the surfaces, the valve spool might bottom in the valve 162 so that the entire airload of the surfaces could be transmitted back to the pilot. To prevent this, the spring in rod 182 will compress upon an applied load of about 85 lbs.

As in the aileron system previously described, the direct separate connection of each power unit valve to the rudder pedal with the described cross connection between valves, permits either of the rudder cables to operate both valves in case of breakage of one of the rudder cable connectors.

While the present invention has been described as being applied to the control of various surfaces in airplanes of the all-wing type, it obviously can be utilized for the control of any airplane control surface where the aerodynamic restoring forces are large and where the aerodynamic response is either substantially linear or non-linear with surface movement. In either case the aerodynamic response can be made substantially linearly related to movements of the pilot's control element.

From the above description it will also be clearly seen that the present invention makes possible the safe full power operation of airplane control surfaces irrespective of size or aerodynamic resistance to motion. There is no feed-back of any kind from surface to pilot under normal conditions. The operation of the hydraulic cylinder requires only a few pounds of pilot effort, little more, in fact, than that required to overcome the overall resistance of the cable system and the control neutralizing system. Neutralization of the controls is performed by balanced elastic forces at the pilot's location and the overall pilot effort for normal piloting is small, irrespective of control surface area and aerodynamic forces exerted thereon. The control forces may be made any desired magnitude or made to vary in most any desired manner. They may be altered with ease after the airplane is flown. Since the control forces can be made any desired magnitude, a control stick rather than a column and wheel becomes possible even on large airplanes, thus simplifying cockpit design and improving instrument visibility.

As the control cables carry only friction forces and are used to transmit a signal rather than a force, the cables may be very small in diameter with resulting decrease in friction, weight, and sensitivity to temperature changes.

A number of other advantages will be apparent to those skilled in the art. For example, trimming through the full range of surface travel is easily accomplished and can be done without loss of surface power that would normally result from the displacement of a tab and emergency flight control and ground control locks become unnecessary. In addition, the present invention permits the use of one surface to accomplish landing flap, dive brake, and aileron functions, for example, since erratically varying hinge moments will not cause erratic control forces.

Again, because of the relative simplicity as compared to a power boat system, and to the particular cross connections used, the fully powered system of the present invention is less vulnerable to damage in military use, and maintenance problems are reduced.

Reference has been made herein to the pilot of the airplane as being human. Obviously, however, when automatic piloting devices are used to take over control column movements, no difference in results obtained by the present invention will be found. Thus, the term "pilot" as used in the appended claims will be deemed to include both human pilot and/or automatic pilot devices. In fact, the low and uniform control forces required for full power operation of large control surfaces, as described herein, make the system readily adaptable to control by automatic pilot mechanisms and the same power units can be used for normal and auto-pilot movement of the surfaces.

While in order to comply with the statute, the invention has been described in language more or less specific as to structural features, it is to be understood that the invention is not limited to the specific features shown, but that the means and construction herein disclosed comprise a preferred form of putting the invention into effect, and the invention is therefore claimed in any of its forms or modifications within the legitimate and valid scope of the appended claims.

What is claimed is:

1. In an airplane control system; an attitude control surface, a pair of separate surface actuating motors mounted adjacent said surface and operatively connected in parallel thereto, each of said motors having motor control means connected respectively thereto and movable to control its respective motor, a pilot's control element remote from said motor control means, a separate operating connection between each of said motor control means and said pilot's control element, and a direct cross interconnection between said operating connections adjacent each of said control means, said operating connections and said interconnection normally acting simultaneously as a composite unit circuit when controlled by operation of said pilot's control element.

2. In an airplane control system; an attitude control surface, a pair of separate surface actuating motors mounted adjacent said surface and operatively connected in parallel thereto, each of said motors having motor control means connected respectively thereto and movable to control each said motor, a pilot's control element remote from said motor control means, a separate and complete operating connection between each of said motor control means and said pilot's control element, each of said operating connections including a normally rigid, preloaded resilient means adjacent said motor control means, and a direct cross interconnection between said operating connections, said interconnection being made to the pilot's control element end of each of said resilient means.

3. In an airplane control system; an attitude control surface, a pair of separate surface actuating motors mounted adjacent said surface and operatively connected in parallel thereto, each of said motors having motor control means connected respectively thereto and movable to control each said motor, a pilot's control element remote from said motor control means, a separate and complete operating connection between each of said motor control means and said pilot's control element, each of said operating connections including a normally rigid, preloaded resilient means adjacent said motor control means, and a direct cross interconnection between respective points of said operating connections adjacent the pilot's control element end of each of said resilient means, said preloaded resilient means being yieldable only under forces substantially in excess of normal motor control means operating forces, and said resilient means being the only operating connections to said motor control means.

4. In an airplane control system; an attitude control surface, a pair of separate surface actuating motors mounted adjacent said surface and operatively connected in parallel thereto, each of said motors having motor control means connected respectively thereto and movable to control each said motor, a pilot's control element remote from said motor control means, a separate and complete operating connection between each of said motor control means and said pilot's control element, each of said operating connections including a normally rigid, preloaded resilient means adjacent said motor control means, and a direct cross interconnection between said operating connections at points thereof adjacent the pilot's control element end of each of said resilient means, said preloaded resilient means being yieldable in both directions only under forces substantially in excess of normal motor control means operating forces, and said preloaded resilient means being the only operating connections to said motor control means.

5. In an airplane, a full powered system for operating an attitude control surface; comprising first and second hydraulic motors operatively connected in parallel to said surface to move said surface when energized, a source of fluid under pressure, first and second hydraulic valves respectively adjacent and respectively connected to said first and second motors, said valves being movable to respectively energize said motors from said source, a pilot's control element, a first valve operating means connected from said pilot's control element to said first valve, a second valve operating means connected from said pilot's control element to said second valve, each of said valve operating means including normally rigid, preloaded resilient means adjacent to the valve to which the valve operating means is connected, and a valve operating interconnection between said two resilient means at respective points adjacent the pilot's control element ends of said resilient means, said valves being operable solely through said resilient means under all conditions.

6. In an airplane; a full powered system for operating an attitude control surface, comprising first and second hydraulic motors operatively connected in parallel to said surface to move said surface when energized, a source of fluid under pressure, first and second hydraulic valves respectively adjacent and respectively connected to said first and second motors, said valves being movable to respectively energize said motors from said source, a pilot's control element, a first valve operating means connected from said pilot's control element to said first valve, a second valve operating means connected from said pilot's control element to said second valve, each of said valve operating means including normally rigid, preloaded resilient means adjacent to the valve to which the valve operating means is connected, and a valve operating interconnection between said two resilient means at respective points adjacent the pilot's control element ends of said resilient means, said preloaded resilient means being yieldable in both directions and being the sole means of coupling pilot's control element movement with said valves.

7. In an airplane; a full powered system for operating an attitude control surface, comprising first and second hydraulic motors operatively connected in parallel to said surface to move said surface when energized, a source of fluid under pressure, first and second hydraulic valves respectively adjacent and respectively connected to said first and second motors, said valves being movable to respectively energize said motors from said source, a pilot's control element, a first valve operating means connected from said pilot's control element to said first valve, a second valve operating means connected from said pilot's control element to said second valve, each of said valve operating means including normally rigid, preloaded resilient means adjacent to the valve to which the valve operating means is connected, and a valve operating interconnection between said two resilient means at points thereof adjacent the pilot's control element ends thereof, said preloaded resilient means being yieldable in both directions only under forces substantially greater than normal valve operating forces, and said resilient means forming the only valve operating connections of said system.

8. In an airplane control system; an attitude control surface, a pair of motors mounted adjacent said surface and operatively connected in parallel to said surface to move said surface, each of said motors having motor control means connected respectively thereto, an operating connection directly between said two motor control means, a pilot's control element, and a separate complete operating connection between said pilot's control element and each of said motor control means.

9. In an airplane; a full powered system for operating an attitude control surface, comprising first and second hydraulic motors operatively connected in parallel to said surface to move said surface when energized, a source of fluid under pressure, first and second hydraulic valves respectively adjacent and respectively connected to said first and second motors, said valves being movable to energize said motors from said source, a pilot's control element, a first valve operating means connected only between said pilot's control element and said first valve, a second valve operating means separately connected only between said pilot's control element and said second valve, and a valve operating interconnection directly between said valves.

10. In an airplane; a full powered system for operating an attitude control surface, comprising first and second hydraulic motors operatively connected in parallel to said surface to move said surface when energized, a source of fluid under pressure, first and second hydraulic valves respectively adjacent and respectively connected to said first and second motors, said valves being movable to energize said motors from said source, a pilot's control element, first and second valve rods connected respectively to said first and second valves, a first valve operating means connected solely from said pilot's control element to said first valve operating rod, second valve operating means independently connected solely from said pilot's control element to said second valve operating rod, and a complete rod operating interconnection solely between said two rods at points adjacent the respective connections of said valve operating means thereto.

11. In an airplane control system; an attitude control surface, a pair of surface actuating motors mounted adjacent said surface and operatively connected in parallel thereto, each of said motors having motor control means connected respectively thereto, each of said motor control means having two relatively movable parts, an operating link for each of said motor control means, each of said links being connected at one end to one of said two relatively movable parts of a motor control means, a pilot's control element remote from said motor control means, a separate operating connection between the other end of each link and said pilot's control element, a feed-back connection between said surface and each of the other parts of said motor control means, and an operating interconnection directly between said other ends of said two links, said links each including normally rigid, resilient means yieldable under a force greater than the force normally required to operate its respective connected motor control means, said resilient means being the only paths of control from said pilot's control element to said motor control means.

12. Apparatus in accordance with claim 11 wherein said motors are hydraulic and have a cylinder connected to said surface and a piston connected to said airplane and wherein said motor control means is a valve the two parts of which are a spool and a casing attached to said cylinder, and wherein said links are attached at one end to said spools and at the other ends to said operating connections.

13. Apparatus in accordance with claim 11 wherein said motors are hydraulic and have a cylinder connected to said surface and a piston connected to said airplane and wherein said motor control means is a valve the two parts of which are a spool and a casing attached to said cylinder, and wherein said links are attached at one end to said spools and at the other ends to said operating connections and wherein said resilient means is yieldable in two directions.

14. In a full powered airplane attitude control system, an attitude control surface to be moved, two hydraulic motors operating in parallel to move said surface, each said motor including a hydraulic cylinder attached to said surface and a hydraulic piston in said cylinder, said pistons being attached to said airplane, a separate valve casing mounted on each of said cylinders, a source of hydraulic fluid under pressure connected to each of said casings, a separate valve spool movable in each said casing to control fluid energization of its respective motor, a pilot's control element, a separate spool operating rod connected at one respective end thereof to each said spool, the other respective ends of said rods being connected directly by separate linkage means to said pilot's control element to be moved in unison by movement of said latter element, a rod operating cross connection between said other ends of said rods, the range of movement of the spool ends of said rods for full energization of said motors being less than the possible range of movement of the other ends of said rods by said pilot's control element, and a separate normally rigid, preloaded resilient means forming a part of each said rod, each of said resilient means being yieldable only under a load substantially greater than normal spool operating loads, there being no other operating connection of said pilot's control element to either of said valve spools than directly in series through the respective resilient means.

15. Means for controlling the operation of a pair of power-operated actuators connected in parallel to operate a single movable output member in a full-power system, each of said actuators having a movable control member, which comprises: a separate normally rigid, preloaded resilient means connected at one end to each of said control members, respectively, a manual control element remote from said actuator control members, a separate and complete mechanical operating connection between said control element and each of the other respective ends of said two resilient means, and a direct operating interconnection between said other ends of said two resilient means, said preloaded resilient means being yieldable only under forces substantially in excess of normal operating forces of said control members, whereby either of said resilient means will yield if jammed and allow normal operation of the other to actuate said output member.

16. Means for controlling the operation of a pair of hydraulic power actuators connected in parallel to operate a single control surface in a full-power system, each of said actuators having a feed-back connection thereto from said surface, a control valve and a movable valve control rod operatively attached thereto, which comprises: a pair of double-acting, normally rigid, preloaded resilient means connected at one end of each to one of said control rods, respectively, a manual control element remote from said control rods, a separate and complete operating connection from said control element to each respective other end of said resilient means so that said resilient means form the only paths of control transmittal from said control element to said control rods, and a complete operating interconnection directly between said resilient means other ends, said resilient means being yieldable in both directions only under forces substantially greater than normal control rod operating forces.

17. Apparatus in accordance with claim 16 including a source of hydraulic fluid under pressure connected to said control valve, the range of movement of said control rods in said valves for full energization of said actuators being only a small fraction of the possible range of movement of said manual control element for full deflection of said surface, and wherein said entire controlling means has a hydraulic stalling and reversal point under unsafe loads on said surface, said resilient means being yieldable after said valve control rod is bottomed at the end of its range due to said reversal.

References Cited in the file of this patent

UNITED STATES PATENTS

| 949,559 | Wilson | Feb. 15, 1910 |
| 1,339,332 | Greenly | May 4, 1920 |
| 1,763,590 | Klemperer | June 10, 1930 |
| 2,315,110 | Dornier | Mar. 30, 1943 |
| 2,360,542 | Berry | Oct. 17, 1944 |
| 2,366,382 | Burton et al. | Jan. 2, 1945 |
| 2,395,671 | Kleinhans et al. | Feb. 26, 1946 |
| 2,613,890 | Beman | Oct. 14, 1952 |
| 2,616,264 | Grant et al. | Nov. 4, 1952 |
| 2,619,304 | Feeney et al. | Nov. 25, 1952 |
| 2,620,772 | McLane | Dec. 9, 1952 |
| 2,640,466 | Feeney | June 2, 1953 |

FOREIGN PATENTS

| 480,528 | Canada | Jan. 22, 1952 |
| 582,380 | Great Britain | Nov. 13, 1946 |